United States Patent
Neff et al.

(10) Patent No.: US 7,999,849 B2
(45) Date of Patent: Aug. 16, 2011

(54) MOVING OBJECT DETECTION

(75) Inventors: Michael G. Neff, Lake St. Louis, MO (US); Shirley N. Cheng, Richmond Heights, MO (US); Ted L. Johnson, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1491 days.

(21) Appl. No.: 11/383,911

(22) Filed: May 17, 2006

(65) Prior Publication Data

US 2007/0268364 A1    Nov. 22, 2007

(51) Int. Cl.
*H04N 7/18*    (2006.01)
*H04N 9/47*    (2006.01)

(52) U.S. Cl. ........................ 348/155; 348/143
(58) Field of Classification Search .................. 348/143, 348/155
See application file for complete search history.

(56) References Cited

U.S. PATENT DOCUMENTS

| | | | |
|---|---|---|---|
| 3,799,676 A | | 3/1974 | Chatterton |
| 5,481,619 A | * | 1/1996 | Schwartz et al. ............. 382/141 |
| 5,672,872 A | | 9/1997 | Wu et al. |
| 5,699,443 A | * | 12/1997 | Murata et al. ................. 382/107 |
| 5,809,171 A | | 9/1998 | Neff et al. |
| 5,890,808 A | | 4/1999 | Neff et al. |
| 5,946,422 A | | 8/1999 | Neff et al. |
| 5,982,930 A | | 11/1999 | Neff et al. |
| 5,982,945 A | | 11/1999 | Neff et al. |
| 6,272,246 B1 | * | 8/2001 | Takai ............................. 382/209 |
| 6,597,738 B1 | * | 7/2003 | Park et al. ................ 375/240.16 |
| 2003/0222789 A1 | | 12/2003 | Polyakov |
| 2004/0006424 A1 | | 1/2004 | Joyce et al. |
| 2005/0146600 A1 | * | 7/2005 | Chipchase et al. ......... 348/14.02 |
| 2006/0058954 A1 | | 3/2006 | Haney |

FOREIGN PATENT DOCUMENTS

| | | |
|---|---|---|
| EP | 1262789 | 12/2002 |
| EP | 1293925 | 3/2003 |
| GB | 2330801 | 5/1999 |
| JP | 2004325165 | 11/2004 |
| WO | WO2004084136 | 9/2004 |

OTHER PUBLICATIONS

Efe, et al., "A Tracking Algorithm for Both Highly Maneuvering and Nonmaneuvering Targets", Proceedings of the 36th Conference on Decision & Control, San Diego, CA, Dec. 10, 1997, vol. 4, pp. 3150-3155.
Blake, et al., "Data Fusion for Visual Tracking With Particles", Proceedings of the IEEE, New York, vol. 92, No. 3, Mar. 2004, pp, 495-513.
Cohen, et al., "Detecting and Tracking Moving Objects for Video Surveillance", Computer Vision and Pattern Recognition, IEEE conference, vol. 2, Jun. 23, 1999, pp. 319-325.
Yalcin, et al., "A Flow-Based Approach to Vehicle Detection and Background Mosaicking in Airborne Video", Technical Reports, Mar. 2005, pp. 1-15.
European Search Report, completed Sep. 19, 2007, relating to Application No. EP 07 07 5360, 6 pages.

* cited by examiner

*Primary Examiner* — Hung H Lam (57) ABSTRACT

Moving object detection methods and systems are described. In an embodiment, motion likelihoods are accumulated from sets of sequential image frames which are generated from a sensor scan of one or more moving objects. Regions that each indicates a probable moving object from the accumulated motion likelihoods are determined, and the one or more moving objects are then detected from the respective regions that indicate a probable moving object.

20 Claims, 8 Drawing Sheets

Fig. 8

MOVING OBJECT DETECTION

CROSS REFERENCE TO RELATED APPLICATIONS

This patent application is related to the following co-pending, commonly-owned U.S. patent applications: U.S. patent application Ser. No. 11/383,914 entitled "Methods and systems for the detection of the insertion, removal, and change of objects within a scene through the use of imagery" filed on May 17, 2006; U.S. patent application Ser. No. 11/383,907 entitled "Route Search Planner" filed on May 17, 2006; U.S. patent application Ser. No. 11/383,900 entitled "Sensor Scan Planner" filed on May 17, 2006; and U.S. patent application Ser. No. 11/383,919 entitled "Methods and Systems for Data Link Front End Filters for Sporadic Updates" filed on May 17, 2006, which applications are incorporated herein by reference.

TECHNICAL FIELD

The present disclosure relates to moving object detection.

BACKGROUND

Moving object detection and tracking can involve multiple platforms of various configurations operating as an elaborate coordinated system with precise timing synchronization requirements to track a moving object (e.g. objects, targets, and the like). Additionally, tracking moving objects that have been ascertained with another moving vehicle on the ground, or with an airborne platform such as an aircraft, requires continuously updating the changing position information of a moving object. The accuracy of the position updates and the update rate relative to the maneuverability of a detected object are the primary operating characteristics needed to continuously detect and track moving object(s).

The synchronization requirements for multiple, coordinated platforms can be difficult to maintain due to various operational characteristics, environmental effects, and over an extended period of surveillance when tracking multiple moving objects. In addition, some object detection and tracking systems require user or operator-based interaction and participation which can significantly delay position information updates, and renders simultaneous tracking of multiple moving objects impractical.

SUMMARY

In an embodiment of moving object detection, motion likelihoods are accumulated from sets of sequential image frames which are generated from a sensor scan of one or more moving objects. Regions that each indicates a probable moving object from the accumulated motion likelihoods are determined, and the moving objects are then detected from the respective regions that indicate a probable moving object.

In another embodiment of moving object detection, a sensor can scan an area that includes one or more moving objects, and generate a sensor scan from which sequential image frames are received. A detection application can then accumulate motion likelihoods from sets of the sequential image frames, and determine one or more regions from the accumulated motion likelihoods that each indicates a probable moving object. Each of the moving objects can be identified from the respective regions that indicate a probable moving object.

In another embodiment of moving object detection, a sequence of image frames are received from a sensor scan, and a current image frame is aligned with a sequentially previous image frame. Motion likelihoods are generated from the current image frame when aligned with the sequentially previous image frame, and the motion likelihoods are accumulated to generate accumulated motion likelihoods. Region likelihoods are determined for each pixel of the accumulated motion likelihood to detect a region that includes a moving object, and a region association is determined from the region likelihoods where a center of a region association corresponds to a position of the moving object.

BRIEF DESCRIPTION OF THE DRAWINGS

Embodiments of moving object detection are described with reference to the following drawings. The same numbers are used throughout the drawings to reference like features and components.

DETAILED DESCRIPTION

Moving object detection methods and systems are described in which embodiments provide for the detection and tracking of one or more moving objects without having to rely on third-party targeting, a multiple platform coordinated system, human operator interaction, or laser or radar illumination. The likelihood of a moving object that is detected in sequential and aligned image frames being either stationary or moving can be determined from an accumulation of the sequenced image frames. Subsets of regions in the image frames that indicate the highest likelihood of a moving object are selected which eliminates image clutter and stationary objects, such as buildings, trees, and other ground cover. The regions of the image frames that are estimated to be moving objects, and/or that are consistently moving with predicted velocities, can then be detected as the moving objects.

While features and concepts of the described systems and methods for moving object detection can be implemented in any number of different environments, systems, and/or other configurations, embodiments of moving object detection are described in the context of the following exemplary systems and environments.

Figure 1:
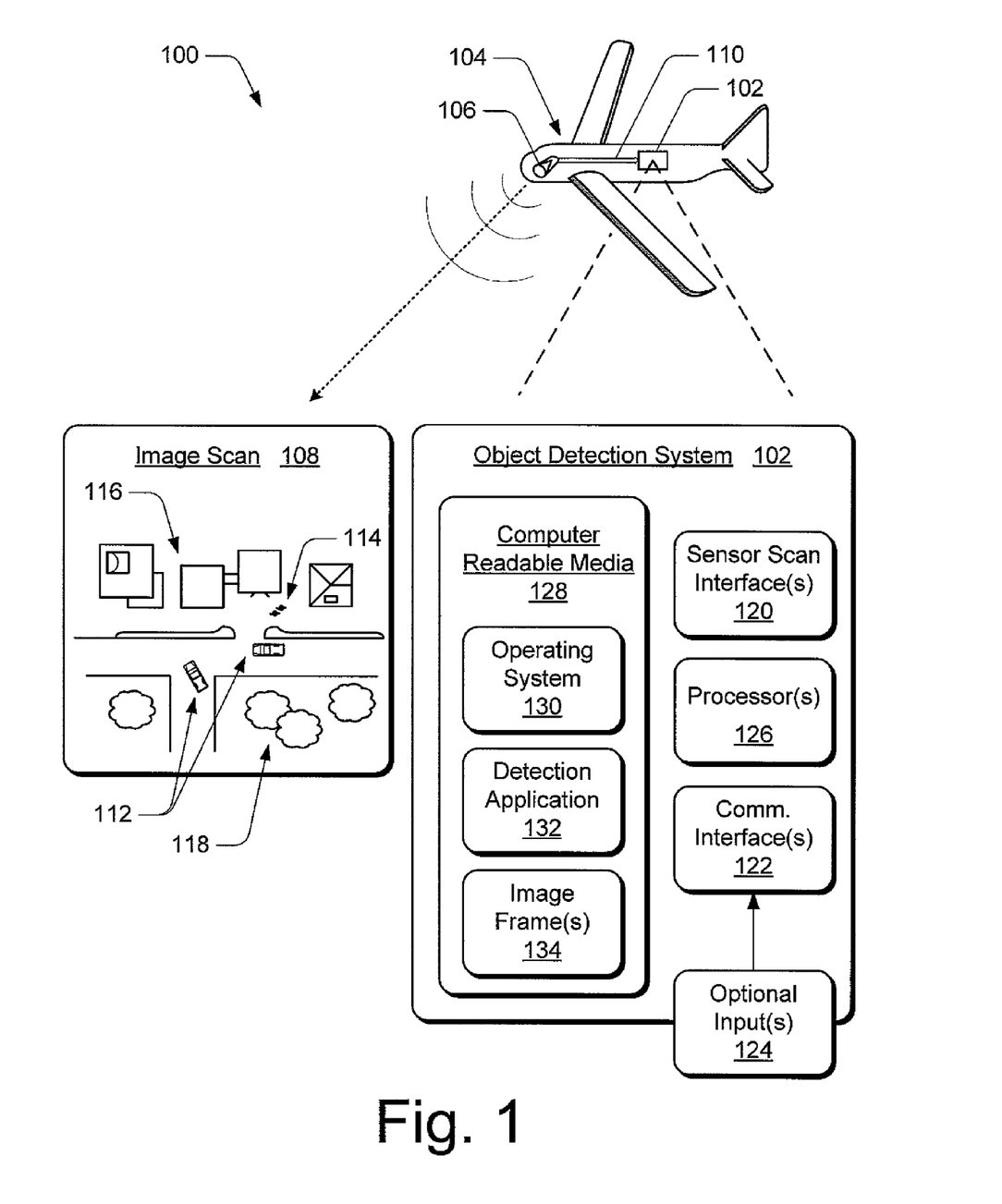
FIG. 1 illustrates an exemplary environment in which embodiments of moving object detection can be implemented.

FIG. 1 illustrates an exemplary environment 100 in which embodiments of moving object detection can be implemented. The environment 100 includes an object detection system 102 embodied in a mobile platform 104, which in this example is shown as an unmanned aerial vehicle (UAV). In alternate embodiments, the object detection system 102 can be implemented in an airborne weapon system, an aircraft, a ground-based mobile or stationary platform, an airborne platform, or any other type of manned or unmanned vehicle that can be implemented to transport the object detection system 102.

The mobile platform 104 includes a sensor 106, such as a high resolution optical or infra-red imaging system, which can be utilized to obtain image scans that include various stationary and moving objects, and which are communicated 110 to the object detection system 102 to extract and determine the positions of the moving objects. In this example, an image scan 108 includes various moving objects, such as vehicles 112 and people 114, and includes various stationary objects such as buildings 116 and trees or other ground cover 118.

Although described as moving "objects", any of the objects may be considered "targets" in a military sense. In a commercial embodiment, moving object detection can be implemented for police surveillance of a vehicle 112, a person 114, or other moving object. In a military embodiment, the object detection system 102 can be implemented in a weapon system, such as a missile or other unmanned armament, to track moving targets and contribute to flight path determinations. In these and other embodiments of moving object detection, multiple moving objects and targets can be detected and tracked without having to rely on third-party targeting, human operator interaction, or laser or radar illumination.

In this example, the object detection system 102 can be implemented as one or more computing-based devices that include sensor scan interface(s) 120 by which to receive the image scans 108 from the sensor 106, and as any other type of sensor scan inputs. The object detection system 102 includes communication interface(s) 122 which can be implemented as any one or more of a serial and/or parallel interface, a wireless interface, any type of network interface, a modem, and as any other type of communication interface to facilitate a connection between the object detection system 102 and a communication network by which other electronic and computing-based devices can communicate data with system 102. For example, in various embodiments of moving object detection, the object detection system 102 can receive optional input(s) 124 which may be received via an interface from a third-party system and/or as user or operator-based inputs to select objects of interest for tracking.

The object detection system 102 also includes one or more processors 126 (e.g., any of microprocessors, controllers, and the like) which process various computer executable instructions to control the operation of the system 102, to communicate with other electronic and computing devices, and to implement embodiments of moving object detection. The object detection system 102 can be implemented with computer readable media 128, such as one or more memory components, examples of which include random access memory (RAM), non-volatile memory (e.g., any one or more of a read-only memory (ROM), flash memory, EPROM, EEPROM, etc.), and a disk storage device such as any type of magnetic or optical storage device.

Computer readable media 128 provides data storage mechanisms to store various information and/or data such as software applications and any other types of information and data related to operational aspects of the object detection system 102. For example, an operating system 130 and/or a detection application 132 can be maintained as software applications with the computer readable media 128 and executed on processor(s) 126 to implement embodiments of moving object detection. In addition, the computer readable media 128 maintains received image scans 108 as stored image frames 134.

The object detection system 102 can receive a sequence of image frames 134, and the detection application 132 can be implemented to detect one or more moving objects from the sequence of image frames 134 by tracking pixel motions of the image frames 134. The detection application 132 accumulates motion likelihoods from sets of the sequential image frames, determines one or more regions that each indicates a probable moving object from the accumulated motion likelihoods, and identifies the one or more moving objects from the respective one or more regions that indicate a probable moving object. The detection application 132 generates pixel value difference images from which the motion likelihoods of the one or more moving objects between a current image frame and a sequentially previous image frame can be determined.

Figure 2:
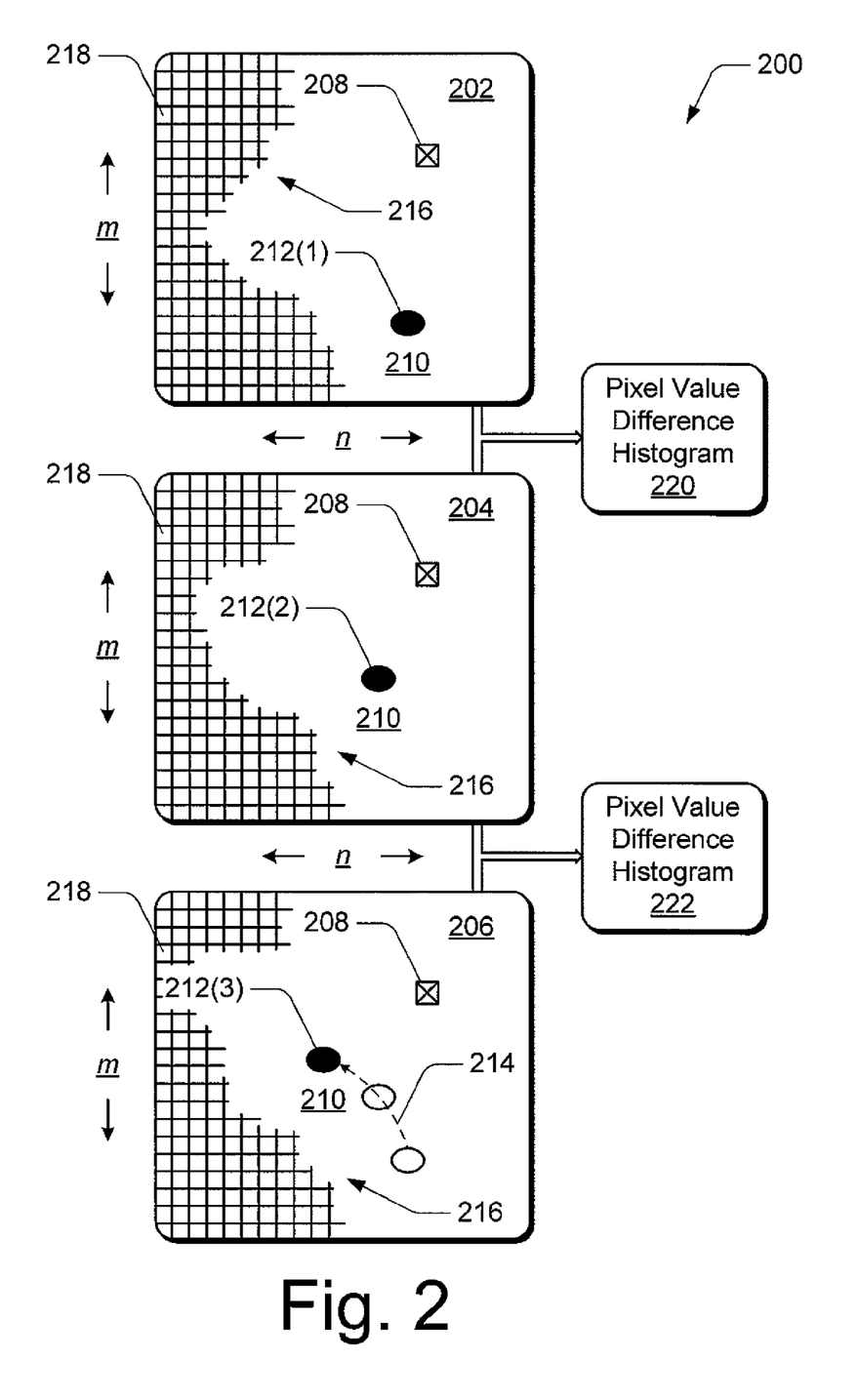
FIG. 2 illustrates exemplary image frames utilized to detect and track moving objects in an embodiment of moving object detection.

FIG. 2 illustrates an example 200 of the image frames 134 (FIG. 1) received as part of an image scan 108 from the sensor 106 in the mobile platform 104. The example 200 includes image frames 202, 204, and 206 that are received as a sequence of image frames from which a moving object can be detected and tracked. In this example, each image frame includes a stationary object 208 and a moving object 210 shown at sequential positions 212(1-3) to illustrate the object moving from position 212(1) in image frame 202, to position 212(2) in image frame 204, and to position 212(3) in image frame 206. Image frame 206 also shows a path 214 by which the moving object 210 travels if the image frames were overlapped and aligned in a sequence view.

Each of the image frames 202, 204, and 206 include "n"× "m" pixels 216, such as image frames that are 256×256 pixels (e.g., 0 to 255 pixels). A pixel 218 in each of the image frames is a pixel of common image overlap for the three sequential image frames. The object detection system 102 generates a relative offset between a current image frame and a sequentially previous image frame to align the image frames such that the pixels 216 of the image frames are correlated. If the image frames 202 and 204 were overlapped, image patterns of the image frames would align such that stationary objects would be positioned at the same location, such as the stationary object 208 in each of the image frame frames 202 and 204.

Each consecutive, sequenced pair of image frames is compared for frame alignment during which a pixel value histogram is generated to determine the entropy of image pixel value differences between the two frames. For example, a pixel value difference histogram 220 is generated from the pixel value differences of image frames 202 and 204, and a pixel value difference histogram 222 is generated from the pixel value differences of image frames 204 and 206. A pair of image frames is best aligned at a position where the smallest entropy occurs. Frame alignment for moving object detection is described in more detail with reference to FIG. 3.

Generally, any of the functions described herein can be implemented using software, firmware (e.g., fixed logic circuitry), hardware, manual processing, or a combination of these implementations. A software implementation represents program code that performs specified tasks when executed on processor(s) (e.g., any of microprocessors, controllers, and the like). The program code can be stored in one or more computer readable memory devices, examples of which are described with reference to the exemplary object detection system 102 shown in FIG. 1. Further, the features of moving object detection as described herein are platformindependent such that the techniques may be implemented on a variety of commercial computing platforms having a variety of processors.

Methods for moving object detection, such as exemplary methods 300, 500, 600, 700, and 800 described with reference to respective FIGS. 3 and 5-8 may be described in the general context of computer executable instructions. Generally, computer executable instructions can include routines, programs, applications, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
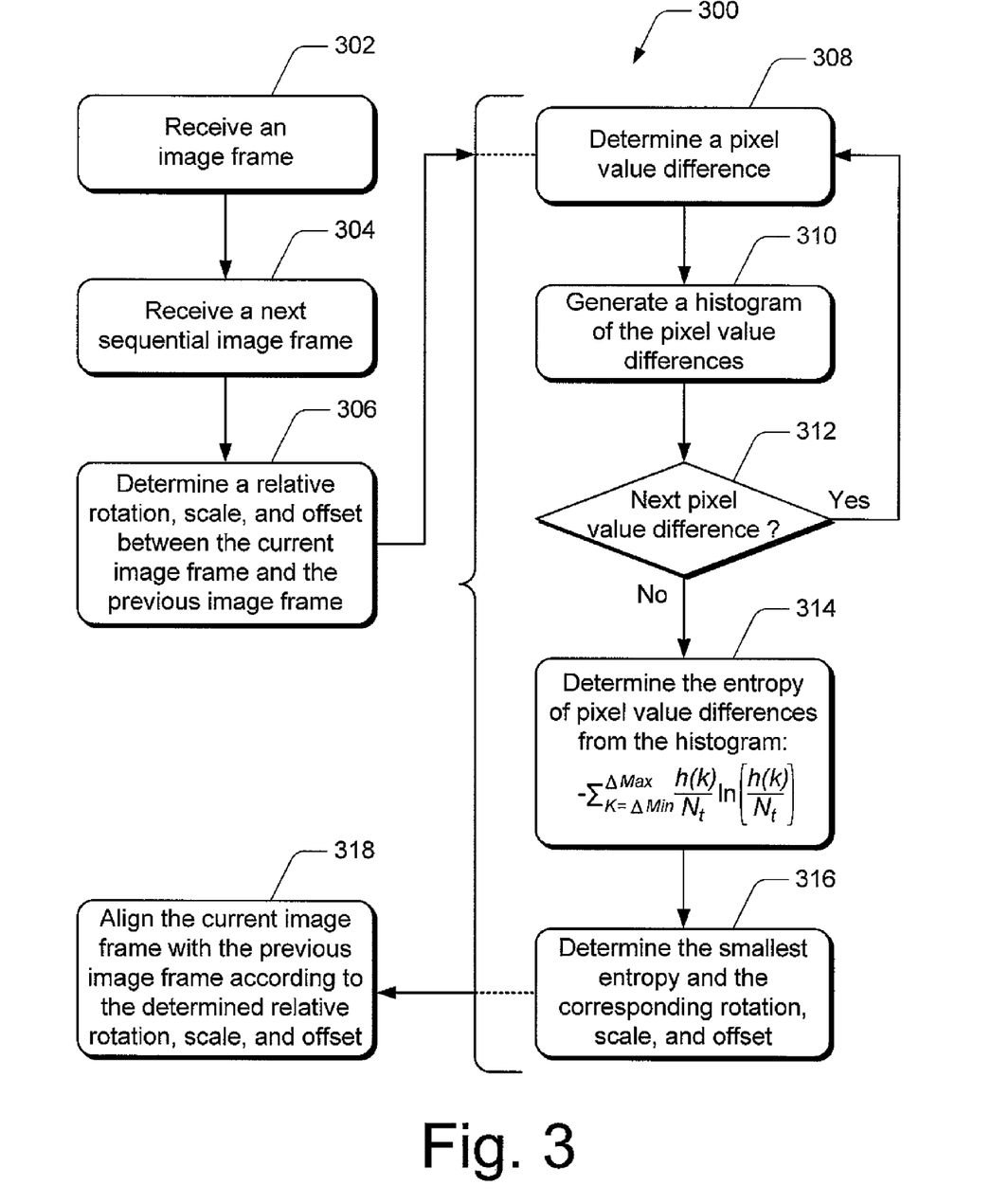
FIG. 3 illustrates exemplary method(s) of frame alignment in an embodiment of moving object detection.

FIG. 3 illustrates an exemplary method 300 of frame alignment for moving object detection and is described with reference to the exemplary environment 100 (FIG. 1) and with reference to the image frames example 200 (FIG. 2). The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, an image frame is received, and at block 304, a next sequential image frame is received. For example, the object detection system 102 (FIG. 1) receives image frame 202 and sequential image frame 204. Image frame 202 is the "current" image frame when received, and subsequently becomes the "previous" image frame when image frame 204 is received after image frame 202. Similarly, image frame 204 is the "current" image frame when received, and subsequently becomes the "previous" image frame when image frame 206 is received after image frame 204.

At block 306, a relative rotation, scale, and offset between the current image frame and the previous image frame is determined as described with reference to blocks 308-316. At block 308, a pixel value difference is determined by subtracting a pixel value of a current image frame from a pixel value of a previous image frame. For example, a pixel value of the common image pixel 218 in the current image frame 204 is subtracted from a pixel value of the common image pixel 218 in the previous image frame 202 to generate the pixel value difference for the particular pixel at a particular rotation, scale, and offset. A pixel value can be based on a gray level of the pixel, a magnitude of the value, or based on a defined range such as −128 to +128.

At block 310, a histogram is generated of the pixel value differences for each associated image frame rotation, scale, and offset or translation. For example, the pixel value difference histogram 220 is generated as each consecutive pixel value difference, column by column and row by row, is generated. The histogram 220 of the pixel value differences is an indexed array of pixel value differences "k" (e.g., an index of pixel value difference levels), where h(k) is a total number of pixels in the pixel value difference histogram 220 that has a pixel value difference of "k".

At block 312, a determination is made as to whether a next pixel value difference is to be determined. If another pixel value difference is to be determined by subtracting a pixel value of a current image frame from a pixel value of a previous image frame (i.e., "yes" from block 312), then the method continues to determine the next pixel value difference at block 308 and to add the generated pixel value difference to the histogram at block 310.

If a next pixel value difference is not going to be determined (i.e., "no" from block 312)—meaning that each pixel value of a current image frame has been subtracted from a pixel value of the previous image frame—then the method continues at block 314 to determine the entropy of the pixel value differences from the generated histogram. For example, the entropy of the pixel value differences is determined by the equation:

$$-\sum_{k=\Delta Min}^{\Delta Max} \frac{h(k)}{N_t} \ln\left(\frac{h(k)}{N_t}\right)$$

where Σ is a summation, "ln" is the natural logarithm, and where,
h(k) is the number of pixel value differences having value "k";
$N_t$ is the total number of pixel value differences;
ΔMin is the minimum pixel value difference; and
ΔMax is the maximum pixel value difference.

At block 316, the smallest entropy of the pixel value differences is determined as well as the corresponding relative rotation, scale, and offset between the current image frame and the previous image frame. At block 318, the current image frame is aligned with the previous image frame according to the determined relative rotation, scale, and offset. For example, the current image frame 204 is aligned with the previous image frame 202 based on the smallest determined entropy which provides the best image frame alignment at the corresponding rotation, scale, and position offset such that the image frames are aligned. By comparison, the pixel(s) within which the stationary object 208 is imaged in the image frames 202 and 204 are likely to have one of the smallest entropies such that image frames 202 and 204 can be aligned by the pixel(s) within which the stationary object 208 is imaged. Similarly, image frames 204 and 206 can be aligned by the pixel(s) within which the stationary object 208 is imaged.

The method 300 can then continue at block 304 to receive a next sequential image frame. For example, the object detection system 102 (FIG. 1) receives the next image frame 206 which becomes the "current" image frame, and image frame 204 becomes the "previous" image frame after image frame 206 is received. At block 306, a relative rotation, scale, and offset between the next current image frame 206 and the previous image frame 204 is determined as described with reference to blocks 308-316, and pixel value difference histogram 222 is generated. The current image frame 206 and the previous image frame 204 are then aligned as described with reference to blocks 314-318. Although only two examples of sequential image frames are described throughout this example, the systems and methods described herein apply to any number of received sequential image frames.

Figure 4:
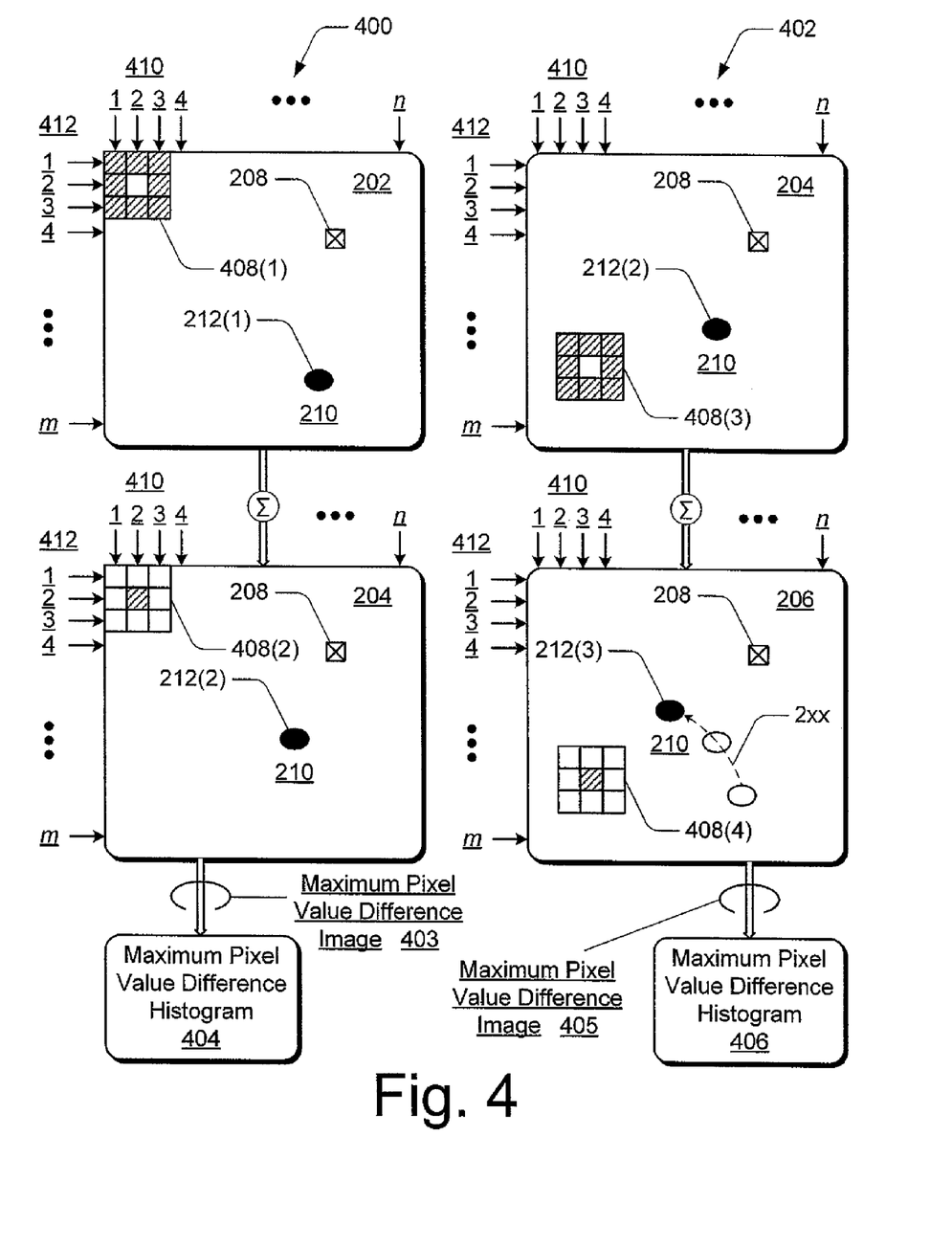
FIG. 4 illustrates examples of determining pixel motion likelihoods in an embodiment of moving object detection.

FIG. 4 illustrates examples 400 and 402 of determining pixel motion likelihoods from sequenced pairs of the aligned image frames 202-204 and 204-206, respectively. As described above with reference to FIG. 2, the image frames 202, 204, and 206 are received as a sequence of image frames from which a moving object can be detected and tracked in an embodiment of moving object detection. In this example, the image frames are still shown to include the stationary object 208 and the moving object 210 shown at sequential positions 212(1-3) to illustrate the object moving from position 212(1) in image frame 202, to position 212(2) in image frame 204, and to position 212(3) in image frame 206.

The object detection system 102 determines pixel motion likelihoods between two aligned, sequenced pair of image frames. In the example 400, image frame 202 is compared to image frame 204 to generate a maximum pixel value difference image 403 and histogram 404 from which motion likelihoods between the two image frames can be determined. Similarly in the example 402, image frame 204 is compared to image frame 206 to generate a maximum pixel value difference image 405 and histogram 406 from which motion likelihoods between the two image frames can be determined.

A reference operator 408 is utilized to compare each pixel in a current image frame with a corresponding pixel in the aligned previous image frame to determine the pixel motion likelihoods. For image frames that are 256×256 pixels, a pixel motion likelihood is determined for each of the 256×256 pixels. In these examples, the reference operator 408 is a 3×3 pixel frame, although reference operators having various numbers of pixels can be implemented in embodiments of moving object detection. The reference operator 408(1) is shown in the upper left corner of image frame 202, and for pixel motion likelihood comparison, the reference operator 408(2) is shown in the upper left corner of image frame 204.

In the example 400, a maximum pixel value difference is generated by determining the maximum difference between the pixel value of the reference operator 408(2) center pixel (i.e., shown filled-in with a line pattern in image frame 204) and the pixel values of the reference operator 408(1) outer pixels (i.e., shown filled-in with a line pattern in image frame 202). This is repeated for every pixel 410(1-$n$) and 412(1-$m$) in the current image frame 204 where "n" is the number of row pixels, and "m" is the number of column pixels. For example, the reference operator 408 is moved from position 410(1) to position 410(2) and so on to position 410($n$), and similarly down each row 412(1-$m$) to determine a maximum pixel value difference for each pixel in the current image frame 204. A maximum pixel value difference image is developed as D(i,j) where i=0 to "n" number of row pixels and j=0 to "m" number of column pixels.

Similarly in example 402, a maximum pixel value difference is generated by determining the maximum difference between the pixel value of the reference operator 408(4) center pixel (i.e., shown filled-in with a line pattern in image frame 206) and the pixel values of the reference operator 408(3) outer pixels (i.e., shown filled-in with a line pattern in image frame 204). This is repeated for every pixel 410(1-$n$) and 412(1-$m$) in the current image frame 206 where "n" is the number of row pixels, and "m" is the number of column pixels. For example, the reference operator 408 is moved from position 410(1) to position 410(2) and so on to position 410($n$), and similarly down each row 412(1-$m$) to determine a maximum pixel value difference for each pixel in the current image frame 206. A maximum pixel value difference image is developed as D(i,j) where i=0 to "n" number of row pixels and j=0 to "m" number of column pixels. Pixel motion likelihoods developed from maximum pixel value differences for moving object detection is described in more detail with reference to FIG. 5.

Figure 5:
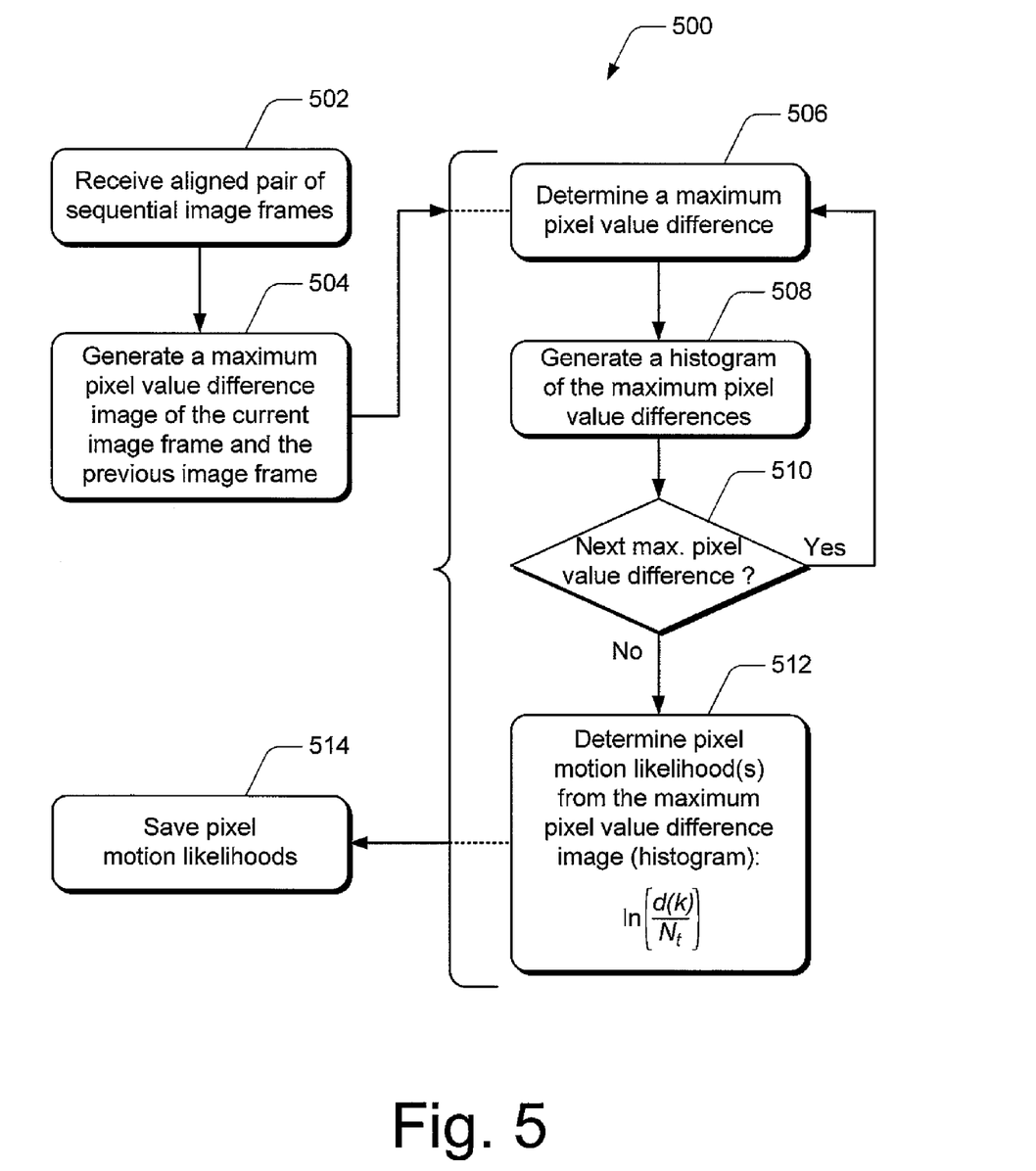
FIG. 5 illustrates exemplary method(s) of pixel motion likelihood detection in an embodiment of moving object detection.

FIG. 5 illustrates an exemplary method 500 of pixel motion likelihood detection for moving object detection and is described with reference to the exemplary environment 100 (FIG. 1) and with reference to the image frame examples 400 and 402 (FIG. 4). The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 502, an aligned pair of sequential image frames is received or obtained. For example, the object detection system 102 receives or requests the aligned image frames 202 and 204, and subsequently the aligned image frames 204 and 206, as described with reference to FIG. 4. As described above, image frame 202 is the "current" image frame when received, and subsequently becomes the "previous" image frame when image frame 204 is received after image frame 202. Similarly, image frame 204 is the "current" image frame when received, and subsequently becomes the "previous" image frame when image frame 206 is received after image frame 204.

At block 504, a maximum pixel value difference image of the current image frame and the previous image frame is generated from a reference operator and the aligned pair of image frames as described with reference to blocks 506-512. At block 506, a maximum pixel value difference is generated by determining the maximum difference between the reference operator center pixel as it relates to the current image frame and the reference operator outer pixels as it relates to the previous image frame. For example, a maximum pixel value difference is generated by determining the maximum difference between the pixel value of the reference operator 408(2) center pixel (i.e., shown filled with a line pattern in image frame 204) and the pixel values of the reference operator 408(1) outer pixels (i.e., shown filled with a line pattern in image frame 202). A pixel value can be based on a gray level of the pixel value, a magnitude of the pixel value, or based on a defined range.

At block 508, a histogram is generated of the maximum pixel value differences. For example, the maximum pixel value difference histogram 404 is generated as each consecutive maximum pixel value difference, column by column and row by row, is generated. A maximum pixel value difference histogram 404 generated as an indexed array of maximum pixel value differences having value "k" (e.g., an index of pixel value difference gray levels), where d(k) is a total number of pixels in the maximum pixel value difference histogram that has a value of "k".

At block 510, a determination is made as to whether a next maximum pixel value difference is to be determined. If another maximum pixel value difference is to be determined by taking the maximum difference between a center pixel value of the reference operator for a current image frame from the outer pixel values of the reference operator for a previous image frame (i.e., "yes" from block 510), then the reference operator is moved to an adjacent or next pixel and the method continues to determine the next maximum pixel value difference at block 506, and adds the generated maximum pixel value difference to the histogram at block 508.

If a next maximum pixel value difference is not going to be determined (i.e., "no" from block 510)—meaning that each pixel value of a current image frame has been subtracted from reference operator pixel values of the previous image frame—then the method continues at block 512 to determine the pixel motion likelihood(s) from the maximum pixel value difference image and the generated histogram. For example, the log-likelihood of motion at each of the pixels is determined by the equation:

$$\ln\left(\frac{d(k)}{N_t}\right)$$

where "ln" is the natural logarithm, and where, d(k) is the number of pixel value differences having a value "k"; and $N_t$ is the total number of pixel value differences.

At block 514, the determined pixel motion likelihoods are saved for reference. The method 500 can then continue at block 502 to receive a next aligned pair of sequential image frames. For example, the object detection system 102 (FIG. 1) receives the aligned image frames 204 and 206, as described with reference to example 402 (FIG. 4). At block 504, a maximum pixel value difference image of the next current image frame 206 and the previous image frame 204 is generated from the reference operator and the aligned pair of image frames as described with reference to blocks 506-512.

Figures 6A, 6B:
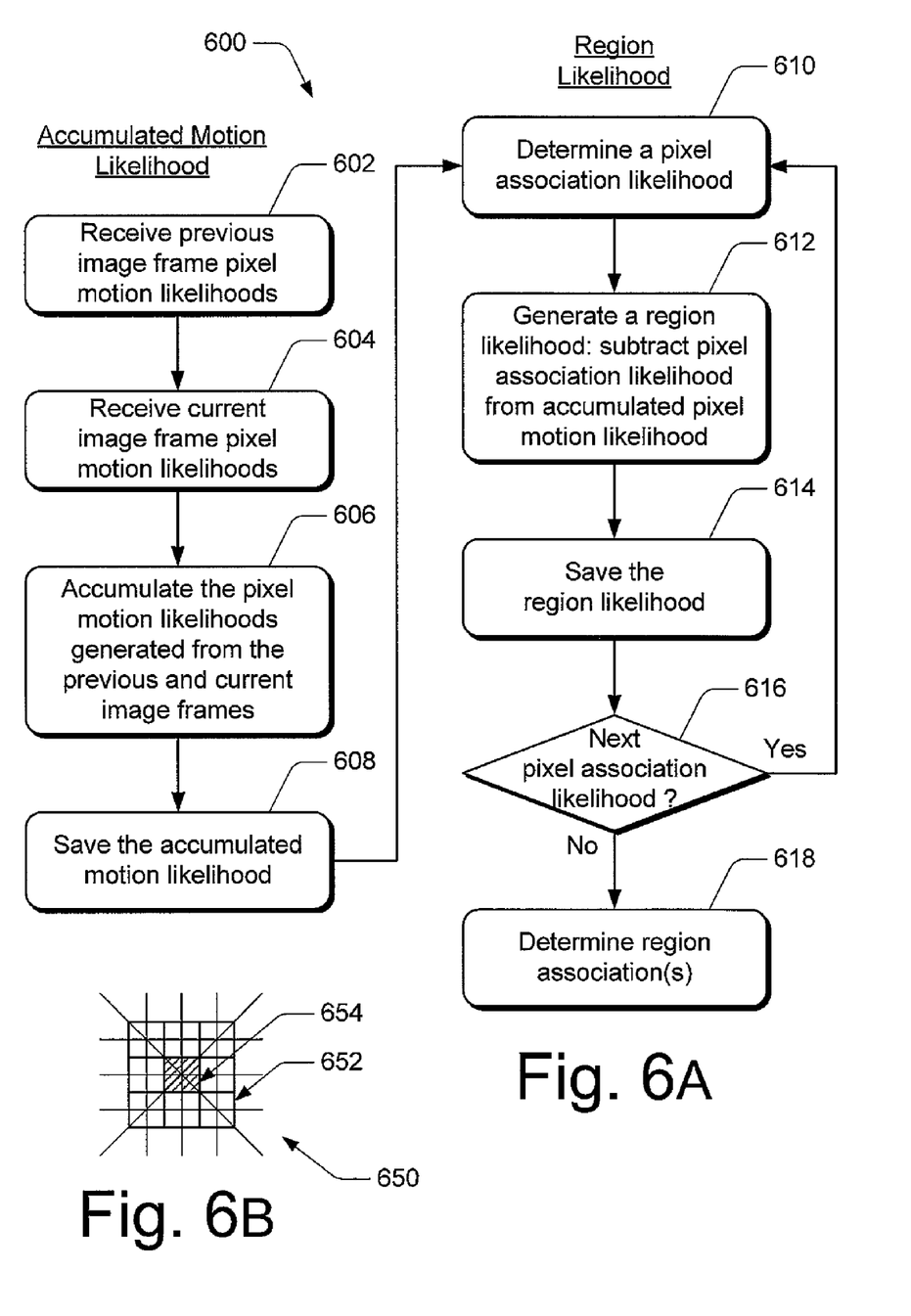
FIGS. 6A-6B illustrate exemplary method(s) of accumulated motion likelihood and region likelihood in an embodiment of moving object detection.

FIGS. 6A-6B illustrate an exemplary method 600 of accumulated motion likelihood and region likelihood for moving object detection and is described with reference to the exemplary environment 100 (FIG. 1) and with reference to the image frame examples 400 and 402 (FIG. 4). The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 602, the previous image frame pixel motion likelihoods are received or obtained, and at block 604, the current image frame pixel motion likelihoods are received or obtained. For example, the object detection system 102 receives or requests the previous image frame 202 pixel motion likelihoods and the current image frame 204 pixel motion likelihoods generated as described with reference to FIG. 5.

At block 606, the previous image frame pixel motion likelihoods are accumulated with the current image frame pixel motion likelihoods. For example, the pixel motion likelihoods generated from the previous image frame 202 are accumulated with the pixel motion likelihoods generated from the current image frame 204 to generate accumulated motion likelihoods. At block 608, the accumulated motion likelihood is saved for reference, and a region likelihood is determined at blocks 610-616.

At block 610, a pixel association likelihood is determined. A pixel association likelihood (also referred to as a "pixel connectedness likelihood") in the example 650 (FIG. 6B) is the maximum of the average horizontal, vertical, and diagonal accumulated motion likelihood within a reference operator 652 centered on the accumulated motion likelihood 654. Reference operator 652 is similar to reference operator 408 described with reference to FIG. 4 which is a 3×3 pixel frame, although reference operators having various numbers of pixels can be implemented in embodiments of moving object detection.

At block 612, a region likelihood is generated by subtracting the pixel association likelihood from the accumulated pixel motion likelihood, and at block 614, the region likelihood is saved for reference. At block 616, a determination is made as to whether a next pixel association likelihood is to be determined. If another pixel association likelihood is to be determined (i.e., "yes" from block 616), then the reference operator is moved to an adjacent or next pixel and the method continues to determine the next pixel association likelihood at block 610. If another pixel association likelihood is not determined (i.e., "no" from block 616), then a region association is determined as described with reference to FIG. 7.

Figure 7:
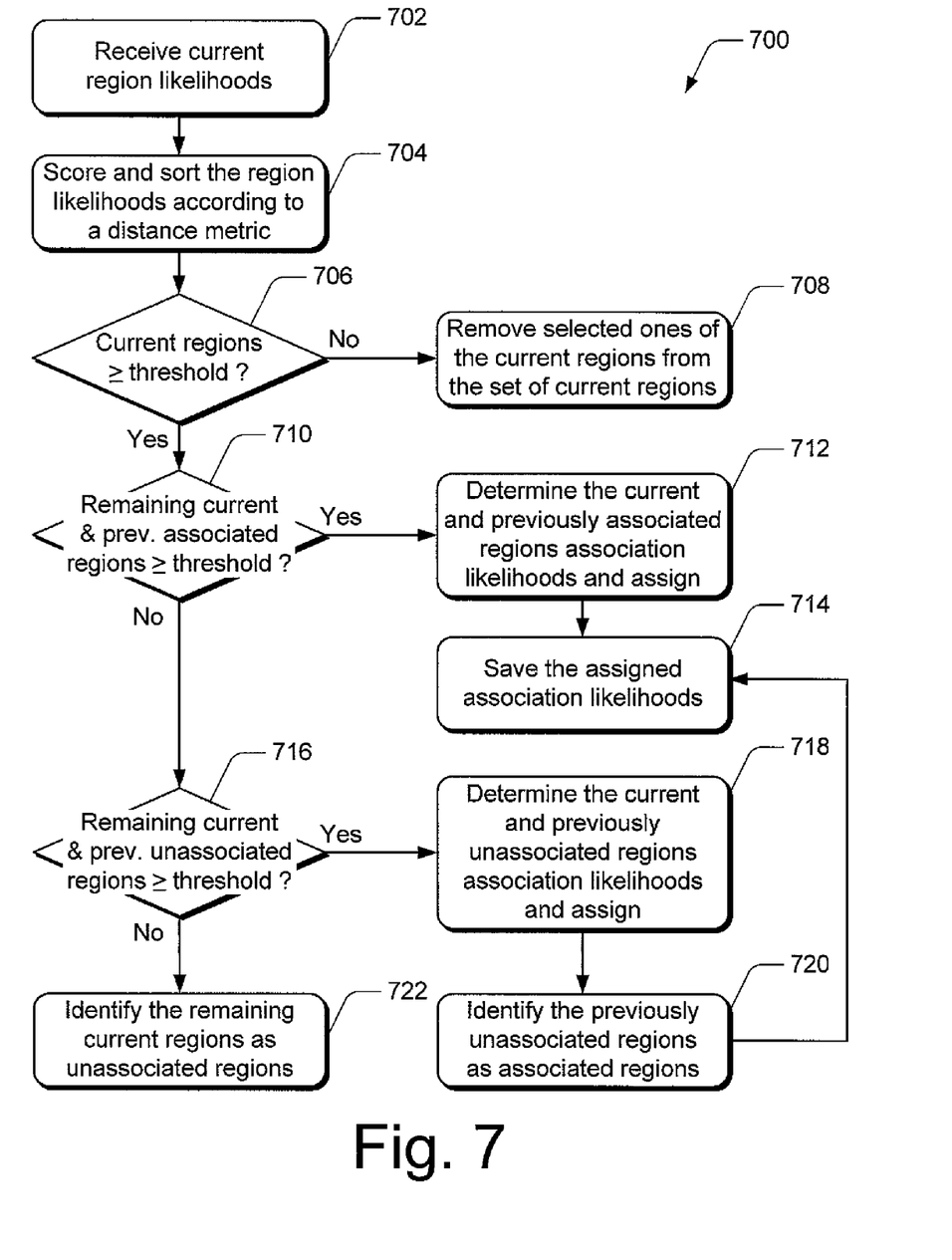
FIG. 7 illustrates exemplary method(s) of region association in an embodiment of moving object detection.

FIG. 7 illustrates an exemplary method 700 of region association for moving object detection and is described with reference to the exemplary environment 100 (FIG. 1). The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 702, current region likelihoods are received or obtained. For example, the object detection system 102 receives or requests the region likelihoods generated as described with reference to FIG. 6. At block 704, the region likelihoods are sorted by a score that corresponds to a distance metric. For example, each of the region likelihoods of accumulated motion likelihoods are evaluated by a general distance metric, such as the Mahalanobis distance, between an "n" region compared against the "m" regions of an accumulated motion likelihood to estimate the likelihood that these regions represent the same object in the current and previous image frames. The Mahalanobis distance is generally a distance measure based on the correlations between variables by which a similarity of the different regions can be identified.

At block 706, a determination is made as to whether current regions meet (to include exceeds) a threshold. The current regions that do not meet or exceed the threshold (i.e., "no" from block 706) are removed from the set of current regions at block 708. For the remaining current regions that do meet the threshold (i.e., "yes" from block 706), a determination is made as to whether the remaining current and previously associated regions meet (to include exceeds) the threshold at block 710. If the remaining current and previously associated regions meet or exceed the threshold (i.e., "yes" from block 710), then association likelihoods of the current and previously associated regions are determined and assigned at block 712. At block 714, the assigned association likelihoods are saved for reference.

For the remaining current regions that do not meet the threshold (i.e., "no" from block 710), a determination is made as to whether the remaining current and previously unassociated regions meet (to include exceeds) the threshold at block 716. If the remaining current and previously unassociated regions meet or exceed the threshold (i.e., "yes" from block 716), then association likelihoods of the current and previously unassociated regions are determined and assigned at block 718. At block 720, the previously unassociated regions are identified as associated regions, and at block 714, the assigned association likelihoods are saved for reference. The remaining current regions that do not meet the threshold (i.e., "no" from block 716), are identified as unassociated regions at block 722, and the method 700 can continue at block 702 to receive or obtain additional current region likelihoods.

Figure 8:
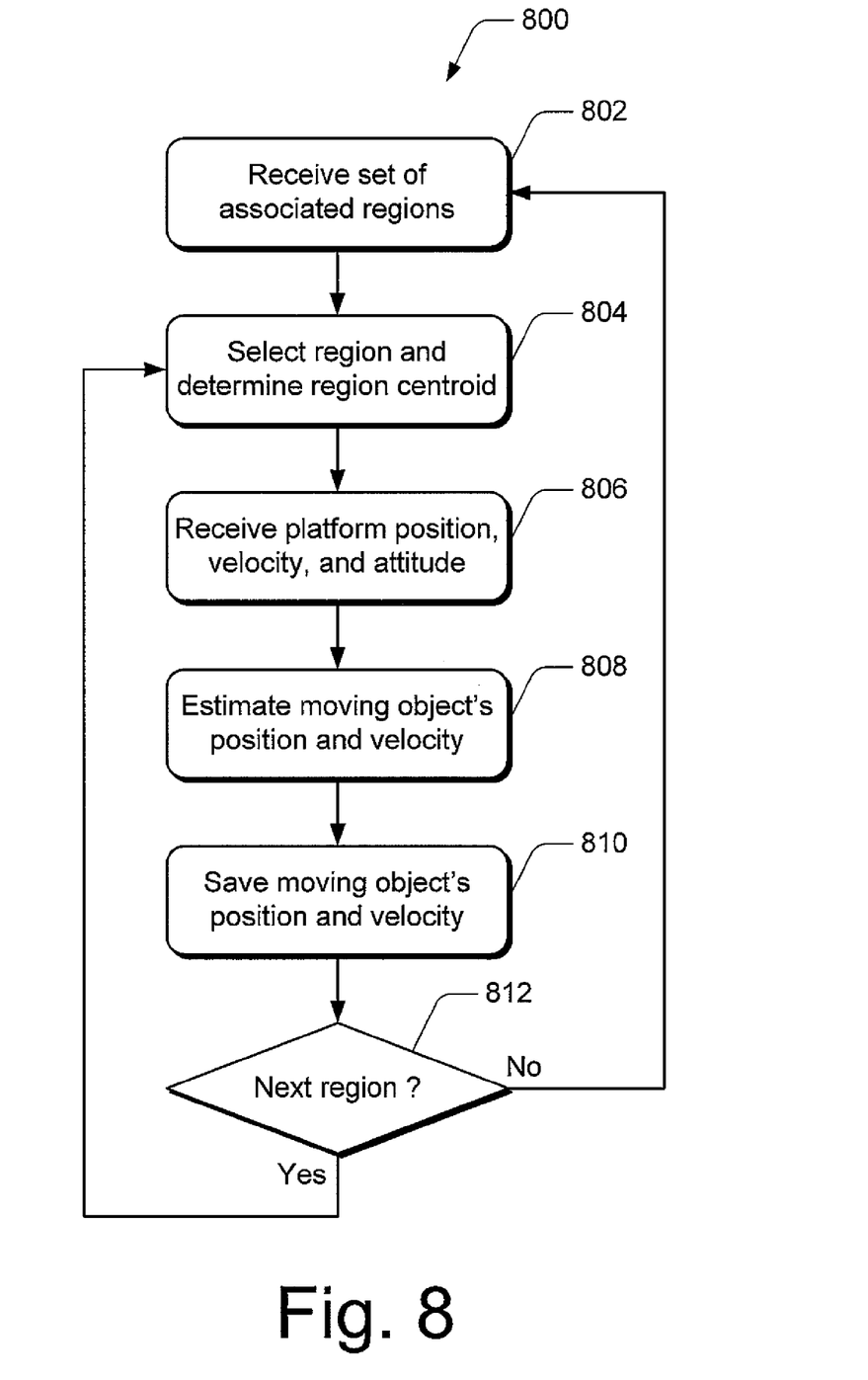
FIG. 8 illustrates exemplary method(s) in an embodiment of moving object detection.

FIG. 8 illustrates an exemplary method 800 of moving object detection in an embodiment of moving object detection and is described with reference to the exemplary environment 100 (FIG. 1). The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 802, a set of associated regions are received or obtained. For example, the object detection system 102 receives or requests the determined associated regions as described with reference to FIG. 7. At block 804, a region is selected and a centroid of the region is determined. The region centroid is determined as an average x, average y position which corresponds to pixel locations in the sensor image frames.

At block 806, platform position, velocity, and attitude information is received. For example, the object detection system 102 receives the position, velocity, and attitude information from an inertial guidance system of the mobile platform 104 (FIG. 1). At block 808, a moving object's position and velocity is estimated. For example, the region centroid data, and the platform position, velocity, and attitude information are evaluated with a Kalman filter to estimate a moving object's motion as a position and a velocity. At block 810, the moving object's position and velocity information is saved for reference.

At block 812, a determination is made as to whether an additional region is to be selected. If an additional region is to be selected (i.e., "yes" from block 812), then a next region is selected at block 804 and the method 800 continues as described with reference to blocks 804-812. If an additional region is not selected (i.e., "no" from block 812), then the method 800 can continue at block 802 to receive additional sets of associated regions.

Although embodiments of moving object detection have been described in language specific to structural features and/or methods, it is to be understood that the subject of the appended claims is not necessarily limited to the specific features or methods described. Rather, the specific features and methods are disclosed as exemplary implementations of moving object detection.

The invention claimed is:

1. A method of detecting one or more moving objects, comprising:
   accumulating motion likelihoods from sets of sequential image frames from a sensor scan of the one or more moving objects;
   determining one or more regions from the accumulated motion likelihoods, the one or more regions each indicating a probable moving object; and
   identifying each of the one or more moving objects from the respective one or more regions that indicate a probable moving object.

2. A method of detecting one or more moving objects as recited in claim 1, wherein each of the one or more moving objects is identified from the regions that also indicate an object moving with a predicted velocity.

3. A method of detecting one or more moving objects as recited in claim 1, further comprising generating maximum pixel value difference images from which the motion likelihoods of the one or more moving objects between a current image frame and a sequentially previous image frame can be determined.

4. A method of detecting one or more moving objects as recited in claim 3, wherein the maximum pixel value difference images are generated with a reference operator such that a maximum pixel value difference between a center pixel of the reference operator as related to the current image frame and outer pixels of the reference operator as related to the sequentially previous image frame is determined.

5. A method of detecting one or more moving objects as recited in claim 1, wherein determining the regions includes:
   determining pixel associations for each pixel of the accumulated motion likelihoods as an average of each horizontal, vertical, and diagonal accumulated motion likelihoods within a reference operator centered on a pixel of the accumulated motion likelihood; and
   subtracting the pixel associations for each pixel from the accumulated motion likelihood.

6. A moving objects detection system, comprising:
   a sensor configured to scan an area that includes one or more moving objects and generate a sensor scan from which sequential image frames are received;
   a detection application configured to:
     accumulate motion likelihoods from sets of the sequential image frames;
     determine one or more regions from the accumulated motion likelihoods, the one or more regions each indicating a probable moving object; and
     identify each of the one or more moving objects from the respective one or more regions that indicate a probable moving object.

7. A moving objects detection system as recited in claim 6, wherein each of the one or more moving objects is identified from the respective one or more regions that also indicate an object moving with a predicted velocity.

8. A moving objects detection system as recited in claim 6, wherein the detection application is further configured to generate maximum pixel value difference images from which the motion likelihoods of the one or more moving objects between a current image frame and a sequentially previous image frame can be determined.

9. A moving objects detection system as recited in claim 8, wherein the detection application is further configured to generate the maximum pixel value difference images with a reference operator such that a maximum pixel value difference between a center pixel of the reference operator as related to the current image frame and outer pixels of the reference operator as related to the sequentially previous image frame is determined.

10. A moving objects detection system as recited in claim 6, wherein the detection application is further configured to:
    determine pixel associations for each pixel of the accumulated motion likelihoods as an average of each horizontal, vertical, and diagonal accumulated motion likelihoods within a reference operator centered on a pixel of the accumulated motion likelihood; and
    subtract the pixel associations for each pixel from the accumulated motion likelihood to determine the regions.

11. A method of detecting a moving object, comprising:
    receiving a sequence of image frames from a sensor scan;
    aligning a current image frame with a sequentially previous image frame;
    generating motion likelihoods from the current image frame when aligned with the sequentially previous image frame;
    accumulating the motion likelihoods that are generated from the current image frame and from the previous image frame to generate an accumulated motion likelihood;
    determining region likelihoods for each pixel of the accumulated motion likelihood to detect a region that includes the moving object; and
    determining a region association from the region likelihoods according to a distance metric, a center of the region association corresponding to a position of the moving object.

12. A method of detecting a moving object as recited in claim 11, wherein the sequence of image frames from the sensor scan are scanned with at least one of: an optical sensor; an infra-red imaging sensor.

13. A method of detecting a moving object as recited in claim 11, wherein the current image frame is the last image frame received, and the sequentially previous image frame is the image frame received prior to the current image frame.

14. A method of detecting a moving object as recited in claim 11, wherein aligning the current image frame with the sequentially previous image frame includes determining a relative rotation, scale, and offset of the current image frame from the sequentially previous image frame based on pixel intensity values determined by subtracting pixel values of the current image frame from pixel values of the sequentially previous image frame, and wherein the current image frame is aligned with the sequentially previous image frame based on the relative rotation, scale, and offset.

15. A method of detecting a moving object as recited in claim 11, wherein generating the motion likelihoods includes generating a maximum pixel value difference image from which the motion likelihood of the moving object between the current image frame and the sequentially previous image frame can be determined.

16. A method of detecting a moving object as recited in claim 15, wherein the maximum pixel value difference image is generated from each pixel with a reference operator such that a maximum pixel value difference between a center pixel of the reference operator as related to the current image frame and outer pixels of the reference operator as related to the previous image frame is determined.

17. A method of detecting a moving object as recited in claim 11, wherein determining the region likelihoods for each pixel of the accumulated motion likelihood includes:
- determining pixel associations for each pixel of the accumulated motion likelihood as an average of each horizontal, vertical, and diagonal accumulated motion likelihoods within a reference operator centered on a pixel of the accumulated motion likelihood; and
- subtracting the pixel associations for each pixel from the accumulated motion likelihood.

18. A method of detecting a moving object as recited in claim 11, wherein determining the region association includes correlating the region likelihoods based on a Mahalanobis distance to determine a similarity of region likelihoods.

19. A method of detecting a moving object as recited in claim 11, further comprising determining additional region associations from the region likelihoods according to the distance metric, and wherein centers of the respective additional region associations are each determined to be a moving object for multiple moving object detection.

20. A method of detecting a moving object as recited in claim 11, further comprising:
- aligning each subsequent current image frame with each sequentially previous image frame to generate an aligned set of image frames;
- generating additional motion likelihoods for each aligned set of image frames;
- accumulating the additional motion likelihoods for each aligned set of image frames to generate additional accumulated motion likelihoods;
- determining additional region likelihoods for each pixel of the additional accumulated motion likelihoods to detect regions that each include a moving object for multiple moving object detection; and
- determining additional region associations from the additional region likelihoods according to the distance metric, and wherein centers of the respective additional region associations are each determined to be a moving object.

* * * * *